(12) United States Patent
Diao et al.

(10) Patent No.: US 8,560,466 B2
(45) Date of Patent: *Oct. 15, 2013

(54) METHOD AND ARRANGEMENT FOR AUTOMATIC CHARSET DETECTION

(75) Inventors: Lili Diao, Nanjing (CN); Yun-chian Cheng, Merced, CA (US)

(73) Assignee: Trend Micro Incorporated, Tokyo (JP)

( * ) Notice: Subject to any disclaimer, the term of this patent is extended or adjusted under 35 U.S.C. 154(b) by 553 days.

This patent is subject to a terminal disclaimer.

(21) Appl. No.: 12/714,378

(22) Filed: Feb. 26, 2010

(65) Prior Publication Data

US 2011/0213736 A1 Sep. 1, 2011

(51) Int. Cl.
*G06F 15/18* (2006.01)
(52) U.S. Cl.
USPC .......................................................... 706/12
(58) Field of Classification Search
USPC ..................................................... 706/12, 62
See application file for complete search history.

(56) References Cited

U.S. PATENT DOCUMENTS

| | | | |
|---|---|---|---|
| 5,857,179 A | 1/1999 | Vaithyanathan et al. | |
| 5,867,799 A | 2/1999 | Lang et al. | |
| 5,987,457 A | 11/1999 | Ballard | |
| 6,157,905 A | 12/2000 | Powell | |
| 7,028,325 B1 * | 4/2006 | Rui et al. | 725/37 |
| 7,356,187 B2 | 4/2008 | Shanahan et al. | |
| 2003/0217052 A1 * | 11/2003 | Rubenczyk et al. | 707/3 |
| 2004/0054887 A1 | 3/2004 | Paulsen et al. | |
| 2005/0125369 A1 * | 6/2005 | Buck et al. | 706/12 |
| 2005/0228783 A1 * | 10/2005 | Shanahan et al. | 707/3 |
| 2005/0234953 A1 * | 10/2005 | Zhang et al. | 707/101 |
| 2005/0259866 A1 * | 11/2005 | Jacobs et al. | 382/157 |

OTHER PUBLICATIONS

Li et al, "A composite approach to language/encoding detection", 19th International Unicode Conference, San Jose, Sep. 2001.*
Karypis et al, "Fast Supervised Dimensionality Reduction Algorithm with Applications to Document Categorization & Retrieval", CIKM 2000, McLean, VA USA, 2000.*
Marton, "On Compression-Based Text Classification", Proc. of the 27th European Conference on Information Retrieval, Springer-Verlag, Mar. 21-23, 2005, ACM SIGIR Forum, vol. 39 No. 1 Jun. 2005.*
Zhang, "An Evaluation of Statistical Spam Filtering Techniques", ACM Transactions on Asian Language Information Processing, vol. 3, No. 4, Dec. 2004, pp. 243-269.*

(Continued)

*Primary Examiner* — Jeffrey A Gaffin
*Assistant Examiner* — Ilya Traktovenko
(74) *Attorney, Agent, or Firm* — IPSG, P.C. Intellectual Property Law

(57) ABSTRACT

The invention relates, in an embodiment, to a method for handling a received document. The method includes receiving a plurality of text document samples. The method includes training, using a plurality of text document samples, to obtain a set of machine learning models. Training includes generating fundamental units from the plurality of text document samples for charsets of the plurality of text document samples. Training includes extracting a subset of said fundamental units as feature lists and converting the feature lists into a set of feature vectors. Training further includes generating the set of machine learning models from the set of feature vectors. The method includes applying the set of machine learning models against a set of target document feature vectors converted from the received document. The method includes decoding the received document to obtain decoded content of the received document based on at least the first encoding scheme.

15 Claims, 13 Drawing Sheets

(56) References Cited

OTHER PUBLICATIONS

Lu et al, "A SVM Method for Web Page Categorization Based on Weight Adjustment and Boosting Mechanism", FSKD 2005, LNAI 3614, pp. 801-810, 2005.*

Liu et al, "Language Identification of Character Images Using Machine Learning Techniques", Proceedings of the 2005 Eight International Conference on Document Analysis and Recognition (ICDAR'05), 2005 IEEE.*

Hao, "Switchboard Language Model Improvement with Conversational Data from Gigaword", Internship at ESAT-PSI Speech Group, Jun. 2004.*

Ghanem et al, "Automatic Scientific Text Classification Using Local Patterns: KDD CUP 2002 (Task 1)", Dep. Of Computing, Imperial College of Science Technology & Medicine 180 Queens Gate, London SW7 2BZ, UK, 2002.*

He et al, "On Machine Learning Methods for Chinese Document Categorization", 2003 Kluwer Academic Publishers, Manufactured in the Netherlands, Applied Intelligence 18, 311-322, 2003.*

Hynek, "Document Classification in a Digital Library", Technical Report No. DCSE/TR-2002-04, Distribution: public, Feb. 2002.*

Gliozzo, et al, "Domain Kernels for Text Categorization", Proceedings of the 9th Conference on Computational Natural Language Learning (CoNLL), 2005 Association for Computational Linguistics, pp. 56-63, Ann Arbor, Jun. 2005.*

"Methods and Arrangement for SIM Algorithm Automatic Charset Detection", U.S. Appl. No. 12/714,392, filed Feb. 26, 2010.

"Notice of allowance and Fees Due", U.S. Appl. No. 12/714,392, Mailing Date: Jun. 28, 2010.

"U.S. Appl. No. 11/238,349", filed Sep. 28, 2005.

"U.S. Appl. No. 11/238,478", filed Sep. 28, 2005.

"U.S. Appl. No. 11/238,351", filed Sep. 28, 2005.

Mladenic, et al., "Feature Selection on Hierarchy of Web Documents", Decision Support Systems vol. 35, Issue 1, Apr. 2003, pp. 45-87.

"Final Office Action", U.S. Appl. No. 11/238,478, Mailing Date: Feb. 2, 2009.

"Non Final Office Action", U.S. Appl. No. 11/238,478, Mailing Date: Nov. 5, 2008.

"Non Final Office Action", U.S. Appl. No. 11/238,349, Mailing Date: Oct. 24, 2008.

"Final Office Action", U.S. Appl. No. 11/238,349, Mailing Date: Feb. 2, 2009.

"Non Final Office Action", U.S. Appl. No. 11/238,351, Mailing Date: Oct. 18, 2006.

"Final Office Action", U.S. Appl. No. 11/238,351, Mailing Date: May 17, 2007.

"Supplemental Notice Allowability", U.S. Appl. No. 11/238,478, Mailing Date Apr. 1, 2010.

"Supplemental Notice Allowability", U.S. Appl. No. 11/238,349, Mailing Date: Apr. 1, 2010.

* cited by examiner $$CrossEntropy(t_k) = P(t_k) \sum_i P(C_i|t_k) \log \frac{P(C_i|t_k)}{P(C_i)}$$

FIG. 4

$$\vec{V}(Doc_i) = (val(t_{i1}), \dots, val(t_{ik}), \dots, val(t_{in})) \quad k = 1, 2, \dots, n$$

FIG. 5

$$val(t_{ik}) = \frac{tf_{ik} \cdot \log(\frac{m}{d_{ik}} + \alpha)}{\sqrt{\sum_{k=1}^{n} tf_{ik}^{2} \cdot \log^{2}(\frac{m}{d_{ik}} + \alpha)}}$$

FIG. 6

$$\min_{\omega \in h} \frac{1}{2} \|\omega\|_2^2$$

$$\text{subject to} \quad y_n(\omega \cdot \phi(x_n) + b) \geq 1 \quad n = 1, \ldots, N$$

FIG. 7

$$f(x) = \text{sgn}\left(\sum_{x_i \in SV} y_i \alpha_i^* \cdot K(x_i \cdot x) - b_0\right)$$

FIG. 8

$$W(\alpha) = \sum_{i=1}^{N} \alpha_i - \frac{1}{2} \sum_{i,j=1}^{N} \alpha_i \alpha_j y_i y_j K(x_i, x_j)$$

FIG. 9

$$b_0 = \frac{1}{2}[\omega_0 \cdot x^*(1) + \omega_0 \cdot x^*(-1)]$$

FIG. 10

$$f(x) = \text{sgn}\left(\sum_{x_i \in SV} l_i \alpha_i^* \cdot K(x_i \cdot x) - b_0\right)$$

FIG. 11

$$f^{(t)}(x) = \mathrm{sgn}\left(\sum_{x^{(t)}_i \in SV^{(t)}} l^{(t)}_i \alpha^{*(t)}_i \cdot K(x^{(t)}_i \cdot x) - b^{(t)}_0 \right)$$

FIG. 12

$$f(x_s) = \text{sgn}\left(\sum_{x^{(s)}_i \in SV^{(s)}} l^{(s)}_i \alpha^{(s)*}_i \cdot K\left(x^{(s)}_i \cdot x_s\right) - b^{(s)}_0\right)$$

FIG. 13

METHOD AND ARRANGEMENT FOR AUTOMATIC CHARSET DETECTION

This application is related to a commonly assigned, patent application entitled "SIM ALGORITHM IN AUTOMATIC CHARSET DETECTION," filed by Diao et al. on Sep. 28, 2005 (Ser. No. 11/238,748) and also is related to commonly, co-pending patent application entitled "METHOD AND ARRANGEMENT FOR SIM ALGORITHM AUTOMATIC CHARSET DETECTION," filed by Diao et al. on even date herewith Ser. No. 12/714,392.

PRIORITY CLAIM

This continuation application claims priority under 37 CFR 1.53(b) of and claims the benefit under 35 U.S.C. §120 to a commonly assigned patent application entitled "Support Vector Machines in Automatic Charset Detection" by Diao et al., application Ser. No. 11/238,478 filed on Sep. 28, 2005, now U.S. Pat. No. 7,689,531, all of which is incorporated herein by reference.

BACKGROUND OF THE INVENTION

Computers have long employed a variety of encoding schemes to represent various writing scripts/characters for computer data. As Internet usage spreads across the globe, there is an acute need to exchange information across language and regional boundaries. However, global information exchange has been hampered by the proliferation of different regional coding schemes.

When data is exchanged between two applications that support multiple encoding schemes, it has been necessary to correctly detect the encoding scheme with which the received data is encoded before the data can be properly utilized and/or displayed. Consider, for example, the situation wherein a computer receives data to be displayed in a web browser. In order to correctly display the data received, the browser initially tries to rely on the encoding information provided by the http server, the web page and/or the end user. This encoding information may be provided via a character-encoding menu, for example. Unfortunately, this type of encoding information is often missing from many http servers and web pages. Moreover, the typical user is generally not sufficiently technical to be able to always provide the encoding information via a character-encoding menu. Without this encoding information, web pages are sometimes displayed as 'garbage' characters, and users are unable to access the desired information and/or functionalities.

As can be appreciated from the above example, in order to properly display and/or analyze the content (word and/or sentences) of a received document, the encoding scheme of that received document needs to be ascertained so that the content can be decoded using the proper decoding scheme. In situations wherein the encoding scheme information is not explicitly provided, an automatic charset (encoding) detection mechanism that can accurately ascertain the proper encoding scheme for use with the received document is highly useful. With reference to the above-discussed browser example, many internet browsers have implemented their versions of automatic charset detection. With such an automatic charset detection mechanism, a web browser can make an educated guess as to the encoding scheme employed when the data is transmitted, and employ that encoding scheme to attempt to display the information received on the browser screen.

Another useful application of automatic charset (encoding) detection is in the area of anti-spam and content filtering of emails. Spam emails are generally bulk electronic unsolicited messages, which are sent by advertisers but tend to be universally detested by recipients. Spammers also tend to provide no information regarding the charset or may provide incorrect charset information. Some users may desire advance filtering of emails based on their contents for the purpose of, for example, properly categorizing or prioritizing the received emails. Content filtering may also be employed to prevent emails that contain offensive and/or malicious content from reaching users. Spam prevention and content-filtering are among the more desirable features offered to email users by email systems and providers.

To perform the anti-spam and/or content filtering function on an incoming email, the content of the email (e.g., words or sentences) needs to be analyzed to discern whether the received email is spam. Alternatively or additionally, the content of the received email may also be examined to determine the email's topic category (e.g., sports, social life, economics, etc.) and/or whether its content is offensive/malicious. Automatic charset detection of received emails renders it possible to perform the content-based filtering and/or analysis correctly or precisely.

Since the precision of the automatic charset detection mechanism is important, improvements in arrangements and techniques for performing automatic charset detection are highly desirable.

SUMMARY OF INVENTION

The invention relates, in an embodiment, to a computer-implemented method for automatic charset detection, which includes detecting an encoding scheme of a target document. The method includes training, using a plurality of text document samples that have been encoded with different encoding schemes, to obtain a set of features and a set of machine learning models. The training includes using a SVM (Support Vector Machine) technique to generate the set of machine learning models from feature vectors converted from the plurality of text document samples. The method also includes applying the set of machine learning models against a set of target document feature vectors converted from the target document. The aforementioned applying includes analyzing the set of target document feature vectors using the set of machine learning models to compute similarity indicia between the set of target document feature vectors and the set of machine learning models associated with the different encoding schemes. A given encoding scheme associated with the set of machine learning models is designated as the encoding scheme if the characteristics of the given encoding scheme represented by the set of machine learning models are computed to be most similar, relative to the characteristics of other encoding schemes, to the set of target document feature vectors.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a graphical representation of equation 1.
FIG. 5 is a graphical representation of equation 2.
FIG. 6 is a graphical representation of equation 3.
FIG. 7 is a graphical representation of equation 4.
FIG. 8 is a graphical representation of equation 5.
FIG. 9 is a graphical representation of equation 6.
FIG. 10 is a graphical representation of equation 7.
FIG. 11 is a graphical representation of equation 8.
FIG. 12 is a graphical representation of equation 9.
FIG. 13 is a graphical representation of equation 10.

DETAILED DESCRIPTION OF EMBODIMENTS

Figure 1:
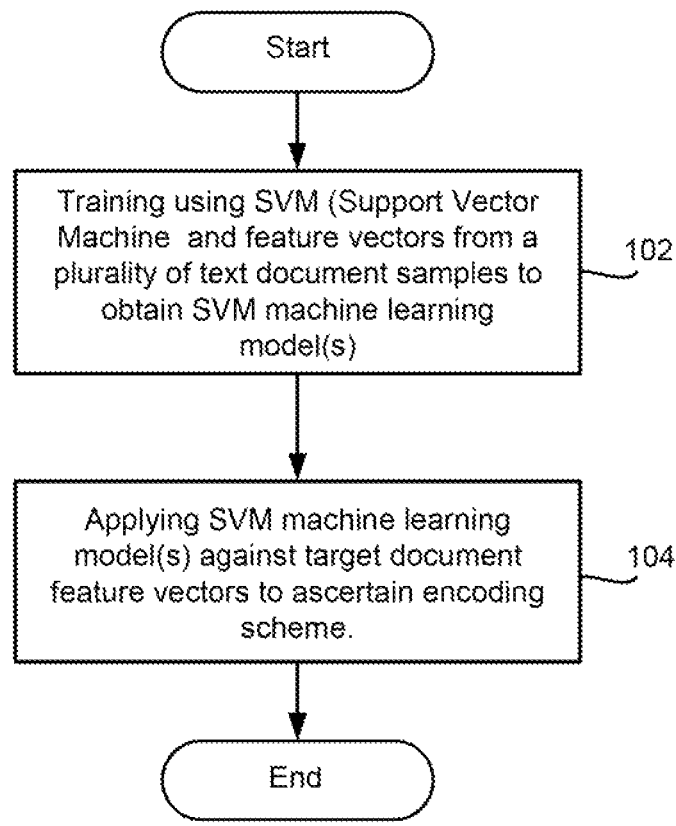
FIG. 1 shows, in accordance with an embodiment of the present invention, a high level flowchart showing the steps involved in automatically detecting the decoding scheme of a target document.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, there is provided a machine learning algorithm, which is employed along with feature selection techniques, to solve the problem of automatic charset detection (ACD). Generally speaking, the automatic charset detection algorithm involves two stages: a training stage and an application stage. In the training stage, feature list(s) and machine learning models are generated for various charset(s). In the application stage, the generated machine learning model(s) are employed to ascertain the encoding scheme of a given document having an unknown encoding scheme.

In an embodiment, the training stage involves collecting text document samples for each charset. The text document samples cover all the charsets of interest and constitute the training sample set. Furthermore, the training stage involves selecting features from the training sample set to generate feature list(s). Additionally, the training stage also involves converting, using the feature lists, the text document samples of the training sample set to feature vectors. The feature vectors are subsequently used to constructing machine learning models for use during the application stage.

For any specific charset, each valid character or character pair forms a fundamental unit for analysis. Therefore, the training sample documents comprise a large number of fundamental units. Using a feature selection technique, for example cross-entropy, mutual information, text weight, information gain, weight of evidence for text, odds radio, word frequency, and even the importance degree of neural network and support vector machine, etc., the fundamental units that best represent the training samples are selected. These selected fundamental units tend to be features that are highly suitable for describing important differences among different charsets.

Once the feature lists are selected, the training samples are converted, using the feature lists, to training vectors using, for example, some mechanisms of VSM (Vector Space Model) such as TF-IDF (Term-Frequency-Inverse Document Frequency). The resultant training vectors, representing the original training documents, for the charsets are thus obtained. Furthermore, the training vectors may be employed to generate machine learning models for the charsets using, for example, a SVM approach (Support Vector Machine). The SVM models are then stored for use during the application stage.

In the application stage, the received document (which include text and optionally may also include non-text elements) having an unknown encoding scheme is converted to feature vector(s) using the feature list(s) extracted during the training stage. After the vector(s) representing the received document are generated, the SVM model(s) generated in the training stage are employed to analyze the vector(s) representing the received document and to ascertain its similarities with each charset. The charset associated with the highest similarity score is designated the encoding scheme for the received document.

The features and advantages of the present invention may be better understood with reference to the figures and discussions that follow. FIG. 1 shows, in accordance with an embodiment of the present invention, a high level flowchart showing the steps involved in automatically detecting the decoding scheme of a target document (e.g., a document received at one computer from another computer via a public or private computer network). In step 102, the training stage involves training, using a SVM (Support Vector Machine) technique to generate SVM learning models from feature vectors that are extracted from a plurality of text document samples. In an embodiment, the text document samples represent text documents with different encodings. Once the machine learning models are obtained, the encoding scheme of a target document may be ascertained using the application step 104. In step 104, the machine learning models are applied against the target document feature vectors converted from the target document. The application stage includes, in an embodiment, the calculation of similarity indicia between the machine learning models associated with characteristics of different charsets and the target document vectors to ascertain one charset that is most similar, relative to other charsets, to the target document. The encoding scheme that is most similar, relative to other encoding schemes, to the target document is then designated the encoding scheme for use in decoding the target document.

Figure 2:
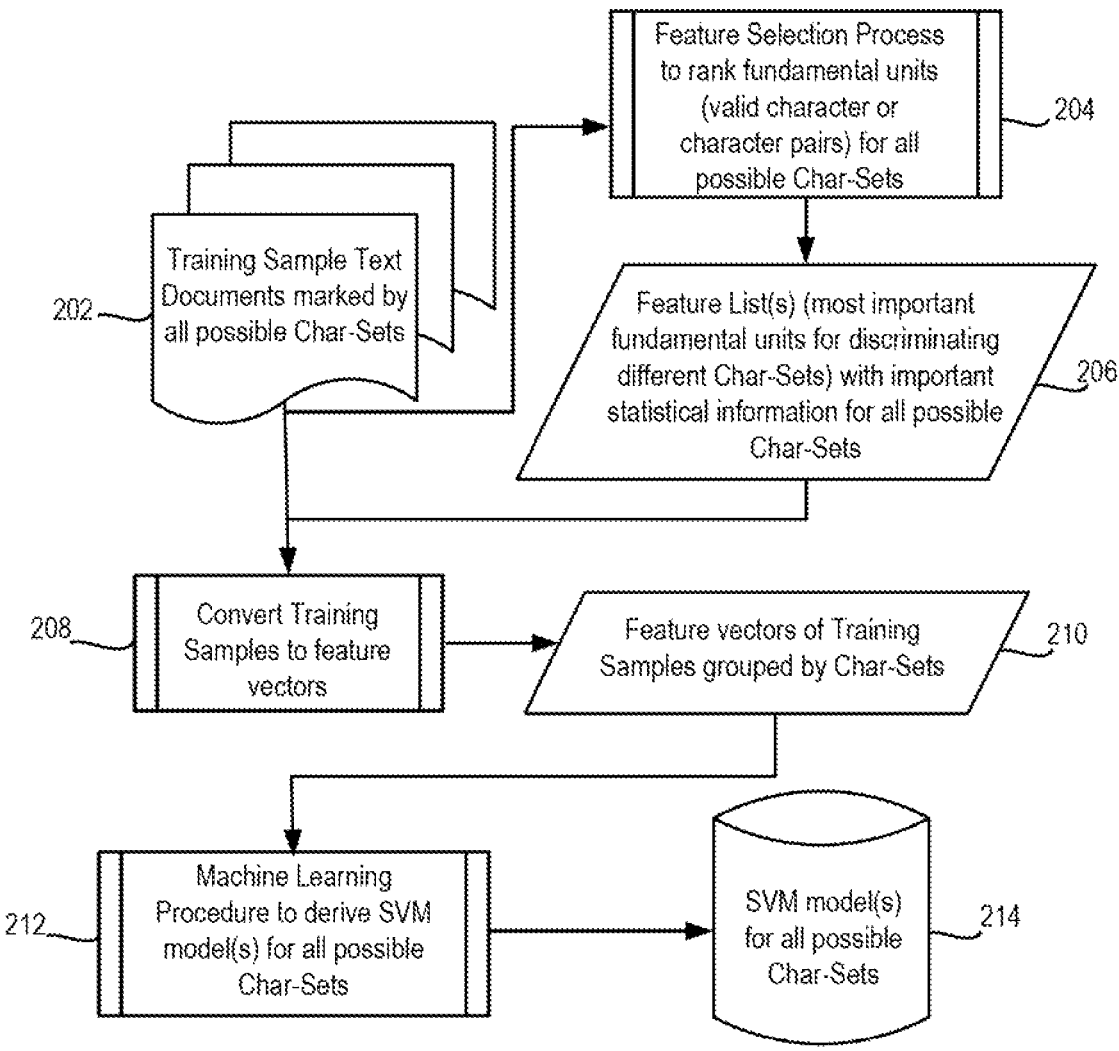
FIG. 2 shows, in accordance with an embodiment of the invention, the steps involved during the training stage.

FIG. 2 shows, in accordance with an embodiment of the invention, the steps involved during the training stage. In step 202, a set of training sample text documents covering all charsets of interest is obtained. In selecting the training sample text documents, preference is given, in an embodiment, to documents that are similar in type or style as the document expected to be received for detection during the application stage.

In step 204, a feature selection process is applied to the training sample text documents in order to select the fundamental units (valid character or character pairs) that are highly discriminatory in describing the differences among charsets (i.e., able to describe the differences among charsets with a high degree of clarity). For a training sample text document, these selected fundamental units are selected among all available fundamental units extracted from that training sample text document. In an embodiment, step 204 involves reducing or filtering all the possible fundamental units so that those remaining fundamental units (called "features" herein) are highly discriminatory in describing the differences among the charsets. As a result of step 204, a set of feature lists (which may have one or more feature lists) is extracted for the charsets of interest (step 206).

As mentioned, feature selection may be performed using a variety of feature selection techniques such as, for example, cross-entropy, mutual information, text weight, information gain, weight of evidence for text, odds radio, word frequency, and even the importance degree of neural network and support vector machine, etc. In an example embodiment, feature selection on the set of training sample text documents is performed using cross-entropy. Feature selection using cross-entropy is described herein below. Further information pertaining to cross-entropy technology may be found in, for example, Koller D., Sahami M. "Hierarchically classifying documents using very few words". Proc. of the 14$^{th}$ International Conference on Machine Learning ICML97:P.170-178, 1997.

Cross Entropy for Feature Selection: Generally speaking, all distinct character terms (fundamental units) of the training text samples comprise the term space. Since this term space includes all fundamental units at this point, the term space tends to be dimensionally large. With the representation approach of VSM, it is inefficient to handle vectors having large dimensions. Furthermore, the application of VSM to vectors having large dimensions tends to obscure the more important terms (fundamental units) related to the problem. Still further, the large number of terms may obscure and negatively impact the optimization of the solutions.

In an embodiment, the extracted distinct character terms (fundamental units) are reduced to construct a more efficient term space. The selected character terms are referred to herein as features. The challenge is to select features that best, or as well as possible, represent distinctive characteristics of a particular charset relative to other charsets. Cross-entropy represents a technique that is capable of quickly computing and ranking features that are highly suitable for discriminating among different charsets.

Generally speaking, the application of cross-entropy may be represented as follows. FIG. 4 is a graphical representation of equation 1 below.

$$CrossEntropy(t_k) = P(t_k) \sum_i P(C_i | t_k) \log \frac{P(C_i | t_k)}{P(C_i)}. \quad \text{Equation 1}$$

In equation 1, $t_k$ represents the k-th term (fundamental unit) in the original term space (the character term space before feature selection). Further, k=1, 2, ..., n (wherein n represents the number of all appeared terms (fundamental units) in the original term space).

$P(t_k)$ represents the occurrence probability of $t_k$. Let $C=\{C_1, C_2, \ldots, C_i, \ldots, C_S\}$ be a finite set of S classes (charsets), i=1, 2, ..., S. Thus $P(C_i)$ represents the occurrence probability of the i-th class (charset), and $P(C_i|t_k)$ is the conditional probability of the occurrence of the i-th class for a given $t_k$.

In an embodiment, the value of expected cross entropy for each term $t_k$ in original term space is computed. The computed values are then employed to rank all the terms. Responsive to the size limitation of the feature set or a threshold value for the expected cross entropy, for example, the top terms in the ranking list may be selected to be features.

These features establish the feature space, which reduces the dimension of the vectors since the features represent only a subset of the original fundamental units. The reduced dimensionality of the feature space as a result of the selection process facilitate more efficient computation and charset detection during the application stage, which is discussed later herein. The result is a set of feature lists for the charsets of interest.

Once the feature lists are obtained, the training samples may be converted, using the feature lists and an appropriate representational technique, to feature vectors (step 208). In an embodiment, TF-IDF (Term-Frequency-Inverse Document Frequency), which is a statistical technique, is employed for the vector conversion task and is discussed in greater detail herein below. Further information pertaining to TF-IDF technology may be found in, for example, G. Salton, A. Wong and C. S. Yang. "A Vector Space Model for Automatic Indexing." Communication of the ACM, V.18:613-620,1995; Gerard Salton, Christopher Buckley, Term-weighting approaches in automatic text retrieval, Information Processing and Management: an International Journal, v.24 n.5, p. 513-523, 1988.

TF-IDF: VSM (vector space model) is currently one of the more popular representational models for text documents.

Given a set of in training text documents, $D=\{Doc_1, Doc_2, \ldots, Doc_m\}$, for any $Doc_i \in D$, i=1, 2, ..., m, the training text document can be represented as a normalized feature vector $$\overline{V}(Doc_i) = (val(t_{i1}), \ldots, val(t_{ik}), \ldots, val(t_{in})), k=1, 2, \ldots, n. \quad \text{Equation 2}$$

FIG. 5 is a graphical representation of equation 2 above. In Equation 2, n represents the number of all possible terms in the term space or all the features in the feature space, and $t_{ik}$ represents the k-th term of $Doc_i$.

$val(t_{ik})$ is a numeric value used to measure the importance of $t_{ik}$ in $Doc_i$, $0 \leq val(t_{ik}) \leq 1$. Hence, the problem of processing text documents has been changed to a problem of processing numerical vectors, which is quite suitable to be solved by mathematical methods.

FIG. 6 is a graphical representation of equation 3 below. With TF-IDF approach, $val(t_{ik})$ can be computed by $$val(t_{ik}) = \frac{tf_{ik} \cdot \log\left(\frac{m}{d_{ik}} + \alpha\right)}{\sqrt{\sum_{k=1}^{n} tf_{ik}^2 \cdot \log^2\left(\frac{m}{d_{ik}} + \alpha\right)}}. \quad \text{Equation 3}$$

wherein $tf_{ik}$ represents the appearance frequency of $t_{ik}$ in $Doc_i$. Further, $d_{ik}$ denotes the number of training documents in which $t_{ik}$ appears. Still further, $\alpha$ represents a constant for tuning. In an embodiment, α=0.5 although the value of α may vary from 0 to 1 depending on the value of $$\frac{m}{d_{ik}}.$$

Once the feature vectors are obtained, they may be grouped by charsets (step 210). Thereafter, a machine learning procedure is applied to the grouped feature vectors in order to derive machine learning models for all possible charsets (step 212). The machine learning models (e.g., SVM models in an embodiment) are then stored-to be employed during the application stage to detect the encoding scheme of a received document or message (step 214).

In an embodiment, SVM is employed as the aforementioned machine learning procedure and is discussed in greater detail herein below. Further information pertaining to SVM technology may be found in, for example, Vapnik, V.: The Nature of Statistical Learning Theory. Springer Verlag, New York (1995).

SVM for classification: Support vector machine (SVM) is a new learning method developed in recent years based on the foundations of statistical learning theory. SVM is gaining popularity due to many attractive features and promising empirical performance in the fields of nonlinear and high dimensional pattern recognition.

Let $(x_1, y_1), \ldots, (x_N, y_N) \in \aleph \times \{-1,+1\}$ denote the training samples of size N, where x comes from some set $\aleph \subset R^m$ (m is the dimension) and $y \in \{-1,+1\}$ is the class label (originally SVM is defined for two-class problems, which means there are only two kind of samples: positive (+1) and negative (−1)).

SVM first maps the original sample space to a high-dimensional linear space via a nonlinear mapping defined by a dot product function, and then finds a separating hyper plane, which is optimal and is decided by support vectors, in the linear space. Consider an m-dimensional feature space h, which is a subset of $R^m$ and is spanned by a mapping φ. In a support vector setting, any φ corresponds to a Merceer kernel $k(x, x')=(φ(x)·sφ(x'))$ implicitly computes the dot product in h. The goal of SVM is to find some separating hyper plane described by a vector ω in feature space h. FIG. 7 is a graphical representation of equation 4 below. Finding the hyper plane can be cast into a quadratic optimization problem:

$$\min_{\omega \in h} \frac{1}{2}\|\omega\|_2^2 \qquad \text{Equation 4}$$

subject to $y_n(\omega \cdot \phi(x_n) + b) \geq 1$ $n = 1, \ldots, N$

One selects the hyper plane with minimal VC capacity, which is in this case can be achieved by maximizing the margin. Here, the margin $$\rho = \frac{2}{\|\omega\|_2}$$

is defined as the minimum $l_2$-distance of a training point to the separating hyper plane. Here support vector (SV) are the points $(x_i, y_i)$ that satisfy $y_n(\omega \cdot \phi(x_n)+b)=1$.

FIG. 8 is a graphical representation of equation 5 below. The decision rule of SVM can be re-defined as $$f(x) = \text{sgn}\left(\sum_{x_i \in SV} y_i \alpha_i^* \cdot K(x_i \cdot x) - b_0\right). \qquad \text{Equation 5}$$

Figure 10:
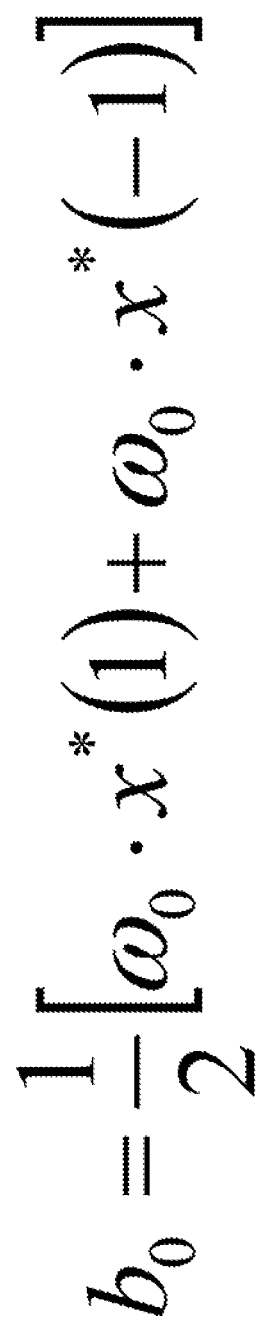

FIG. 9 and FIG. 10 are graphical representations of equation 6 and equation 7 below. Here SV denotes the set of support vectors. $\alpha^*=(\alpha^*_1, \alpha^*_2, \ldots, \alpha^*_{|SV|})$ can be computed by maximizing:

$$W(\alpha) = \sum_{i=1}^{N} \alpha_i - \frac{1}{2}\sum_{i,j=1}^{N} \alpha_i \alpha_j y_i y_j K(x_i, x_j), \qquad \text{Equation 6}$$

and $$b_0 = \frac{1}{2}[\omega_0 \cdot x^*(1) + \omega_0 \cdot x^*(-1)] \qquad \text{Equation 7}$$

where $(x^*(1), y^*(1)) \in SV$ is any positive example and $(x^*(-1), y^*(-1)) \in SV$ is any negative example.

To make the SVM algorithm efficient in establishing models for char sets, SMO and SVM-Light are conceptually employed to decompose the problem for iteratively searching of optimal solutions. The example procedure may proceed as follows.

1) Divide vector α into two sets: the set B for free variables and the set N for fix variables.
2) In each round of iteration, solve a small quadratic programming for $\alpha_B$ and keep the variables in $\alpha_N$ unchanged.
3) Choose different $\alpha_B$ and $\alpha_N$ for each round of iteration. Once the quadratic programming problem is solved, the overall solution should go closer to final solution.
4) Check the optimal conditions for the result from each round of iteration. If the optimal conditions are met, the final solution has been found and then the algorithm end; else step into next round of iteration.

Since almost all feasible SVM algorithms are two-class based, most SVM algorithms therefore cannot handle multi-class categorization problems directly. These multi-class categorization problems may, in an embodiment, be decomposed into a plurality of two-class sub-problems first. Thereafter, the two-class SVM algorithm may be employed to solve these decomposed two-class sub-problems. Note that there are also some versions of the SVM algorithm that can directly work for multi-class problem and thus present no need to decompose into two-class sub-problems.

In some cases, however, it may not be feasible to use SVM to directly solve multi-class problem in that SVM efficiency tends to drop rapidly with the increase in the number of training samples as well as the number of classes. Therefore in some cases, it is preferable to decompose multi-class categorization problems into two-class sub-problems, and to utilize two-class SVM algorithms to solve the two-class sub-problems one by one and then vote for the final decision.

As for the specific approaches for decomposition, there are two popular approaches: one-against-one and one-against-rest. One-against-one establishes a model for each pair of two different classes and thus there are likely a large number of two-class sub-problems after decomposition. On the other hand, the one-against-rest approach establishes a model for each class respectively. For any given class, the one-against-rest approach regards the training samples which belong to this class as a positive class, and all other samples as a negative class. Thus the one-against-rest approach decomposes a multi-class problem into two-class sub-problems, one for each class. In some cases, the one-against-one approach may have a better performance while the one-against-rest approach may have substantially fewer decomposed sub-problems and thus substantially fewer SVM models. For automatic charset detection, there may be many charsets (classes). Accordingly, the one-against-rest may be the more suitable approach to employ for decomposition in these cases.

In the following discussion, the training stage and the application stage are discussed in detail with reference to an example, utilizing the technical framework discussed above.

Suppose $C=\{C_1, C_2, \ldots, C_s, \ldots, C_S\}$ is a finite set of S charsets, where $s=1, 2, \ldots, S$. $C_s$ represents charset #s. The training stage trains SVM model(s) to distinguish among these charsets. For example, if S=4, EUC-KR (Korean) can be selected as charset #1, GB2312 (Simplified Chinese) as charset #2, Big5 (Traditional Chinese) as charset #3 and SHIFT-JIS (Japanese) as charset #4. In this case, a 4-class charset detection problem is presented. Each charset could be regarded as a class or category, from the aspect of Pattern Recognition or Machine Learning.

In the training stage, suppose there exist m text documents $D=\{Doc_1, Doc_2, \ldots, Doc_m\}$ as training samples, anyone of which may be assigned a charset title $C_S$ for encoding.

With respect to feature selection, for a two-class case, read all the fundamental units to a hash table for statistical analysis; calculate the ranking criteria values by selected feature selection approaches such as cross entropy for each of them in order to rank the fundamental units. Note that although the two-class case is chosen for discussion (i.e., S=2), the approach employed may also be employed to solve more complicated multi-class cases since a complex multi-class problem may be decomposed into many smaller two-class sub-problems for solving.

Next, choose the fundamental units with the highest ranking criteria values as features (or feature list) and save them to files. For example, the top 1500 fundamental units (character terms) may be chosen as features. The number of fundamental units chosen may depend on many factors, including for example, the size limitation imposed on the feature set or a threshold value for the expected cross entropy.

For a multi-class case (i.e., S>2), which tends to be the more typical case with automatic charset detection, the features from multi-class training samples may be extracted based on the feature selection approach with the way for doing so in two-class cases. A common feature list for all classes or a distinct feature list for each class respectively may be established. In some cases, one approach (e.g., a distinct feature list for each class) may offer a better performance than another approach (e.g., a common feature list for all classes).

If a distinct feature list for each class is desired, features for each class are extracted one by one. When the features for a given class are extracted, the text document(s) associated with that class would be regarded as positive samples, and all other documents as negative samples. Thus, the multi-class feature selection problem is decomposed into S two-class feature selection sub-problems (negative and positive classes can be considered as two new temporary classes). These two-class sub-problems may now be solved using the aforementioned approach of feature selection for two-class cases. As a result, a plurality of feature lists may be obtained. These may be saved for later use.

For the two-class case, there is one feature list generated in the feature selection procedure. The representation approaches of VSM such as TF-IDF may be employed to convert each training text document sample to feature vectors (or simply, vectors). Specifically, for each text document, the feature terms are checked one by one. In the case of TF-IDF, if a feature term appears in the text document sample, the importance of this feature term in this text document sample would be evaluated by its TF-IDF value. If a feature term does not appear in the text document sample, the importance of this feature term in this text document (as represented by the importance value) would be 0.

Once all the feature terms are evaluated for their importance values, the vector for the text document may be composed. Each element of this vector is an importance value. The position of each element in the vector represents the position of its corresponding feature in the feature list. In other words, the importance of a feature in the sample text document is represented by its corresponding element in the vector. The dimension of this vector is the number of features that exist. As can be appreciated by those skilled in the art, the generated vector represents the text document sample and may be employed in place of the text document sample in later processing.

Thus, all training text documents may be represented by $(x_1, l_1), \ldots, (x_m, l_m)$ pairs, where $x_i$ ($i=1, \ldots, m$) represents the corresponding vector of one of the training text documents $Doc_i$. Further, $l_i$ represents one of the classes (i.e., one of the charsets) in C.

For a multi-class case, there are two possibilities. The first possibility exists when a common feature list is established for all classes in the feature selection procedure. Since there is only one feature list, each training text document would have only one corresponding vector to convert into. Similar to the two-class case, the same approach may be employed to convert each training text document to vector. Consequently all text training documents may be represented by $(x_1, l_1), \ldots, (x_m, l_m)$ pairs, where $x_i$ ($i=1, \ldots, m$) represents the corresponding vector of one of the training text documents $Doc_i$. Further, $l_i$ represents one of the classes (charsets) in C.

The second possibility exists when a distinctive feature list is established for each different class in the feature selection procedure. Because there are different feature lists for different classes, each text document is converted to a different vector, one for each class. Specifically, for a text document, the procedure checks all feature lists generated in the previous feature selection procedure one-by-one. For any given feature list, the text document is converted to a vector in the same manner that conversion is performed for the two-class case mentioned above. Thus, for any given charset #s ($C_s$)(s= 1, \ldots, S), all training text documents may be represented by $(x_{s,1}, l_{s,1}), \ldots, (x_{s,m}, l_{s,m})$ pairs, where $x_{s,i}$ ($i=1, \ldots, m$) represents the corresponding vector of one of the training text documents $Doc_i$ for charset #s. Further, $l_{s,i} \in \{-1(\text{negative}), +1(\text{positive})\}$ ($i=1, \ldots, m$) denotes the negative/positive class label of a text document $Doc_i$ for the feature list of charset #s. The text documents belong to charset #s may be regarded as a positive class and all other text documents may be regarded as belonging to a negative class. Therefore, for each charset, there is a two-class problem to be further solved.

Thereafter, the SVM models may be trained. For the two-class case, the $(x_1, l_1), \ldots, (x_m, l_m)$ pairs represent training samples after conversion. With the two-class SVM algorithm introduced above, it is possible to learn an optimal $\alpha^*=(\alpha^*_1, \alpha^*_2, \ldots, \alpha^*_{|SV|})$ and its corresponding SVM model from them. Once the SVM model is ascertained, the SVM model is saved for use during the application stage to detect the encoding scheme of a received document.

With respect to SVM model training, for multi-class cases, there also exist two possibilities. The first possibility exists when a common feature list is established for all classes in the feature selection procedure. In this case, $(x_1, l_1), \ldots, (x_m, l_m)$ pairs represent the training samples after conversion. The multi-class SVM algorithms may be employed to directly establish a model for all the classes, or decompose the problem to a plurality of two-class sub-problems. Thereafter, the two-class SVM algorithm may be employed to solve in the same manner as is done with the two-class case. Once the SVM models are obtained, these SVM models may be saved for use later in the application stage to detect the encoding scheme of an incoming text document.

The second possibility exists when a distinctive feature list is established for each different class in the feature selection procedure. In this case, for any given class, each sample would have its distinctive vector representation because it is associated with a distinctive feature list. For any given class, the training text documents belonging to that class may be considered as a positive sample, and all other documents may be considered negative samples. In this manner, the problem becomes S two-class categorization problems (negative and positive classes can be considered as two new temporary classes). Thus there exist $(x_{s,1}, l_{s,1}), \ldots, (x_{s,m}, l_{s,m})$ pairs for any given charset #s, and the approach for SVM model construction for the two-class case discussed above may be employed. After all classes are processed, the generated SVM models (one for each charset) may be saved for use later in the application stage to detect the encoding scheme of an incoming text document.

During the application stage, the SVM model(s) and the feature list(s) generated during the training stage are employed to detect the encoding scheme of a received document. Generally speaking, the inputs to the application stage include the received document that has an unknown encoding scheme as well as the SVM model(s) and feature list(s) generated during the training stage. The result of the application stage is the identification of the charset that is to be used for processing the received document.

Figure 3:
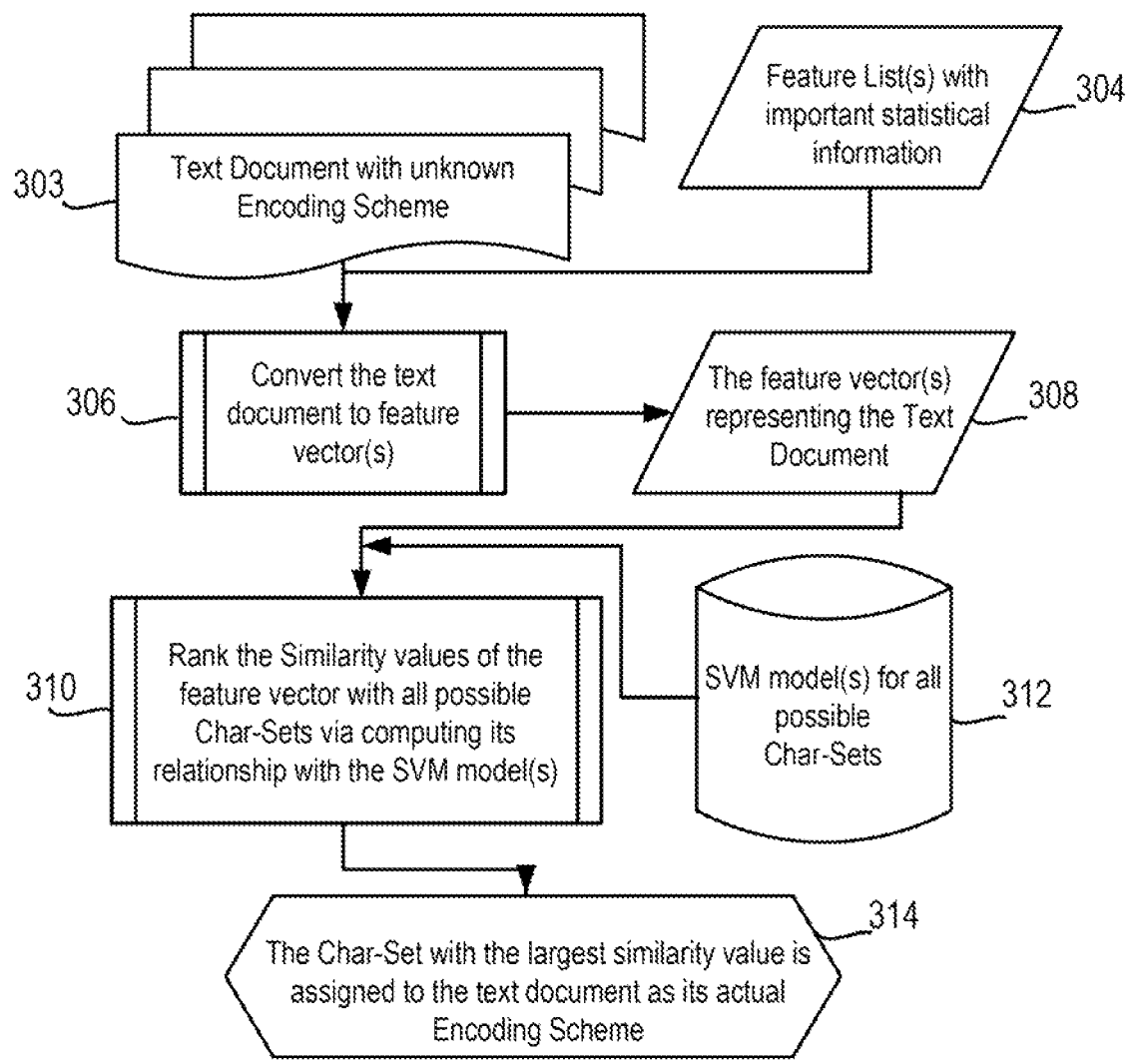
FIG. 3 shows, in accordance with an embodiment of the invention, the steps of an example application stage.

FIG. 3 shows, in accordance with an embodiment of the invention, the steps of an example application stage. In step 302, the text document having an unknown encoding scheme is received. In step 306, the received document is converted to vectors, using the feature list(s) generated earlier in the training stage (304). The conversion to vectors may employ the same approach discussed earlier in connection with the training stage. The resultant feature vector(s) are shown in block 308.

In step 310, the similarity values of the feature vector(s) of the received document with respect to all charsets are computed one-by-one using the set of SVM models generated earlier in the training stage (312). Note that the set of SVM models may represent a SVM model for each charset if, during the training stage, a SVM model is established for each charset. The set of SVM models may also represent a common SVM model for all charsets (i.e., the set of SVM models has one member, representing the common SVM model) if, during the training stage, a common SVM model is established for all charsets. These similarity values indicate the similarity between the vector(s) representing the incoming text document and the set of SVM models representing the characteristics of each charset. The charset associated with the highest similarity score is designated to be the encoding scheme for the received document (step 314).

In the following discussion, the application stage is discussed in detail with reference to an example and the above-discussed technical framework.

With respect to the vector conversion procedure, the same approach employed during the training stage may be employed.

For the two-class case, some approaches of VSM representation such as TF-IDF may be employed to convert the text document to vector. If TF-IDF is employed, for example, the feature terms may be checked one by one. If a feature term appears in the received document Doc (i.e., the received document having an unknown encoding scheme), the importance of this feature term in this text document is evaluated by its TF-IDF value. If a feature term does not appear in the received document Doc, the importance of this feature term in the received document Doc would be 0.

Once all the feature terms are evaluated for their importance values, the vector for the received document Doc may be composed. Each element of this vector is an importance value. The position of each element in the vector represents the position of its corresponding feature in the feature list. In other words, the importance of a feature in the incoming/received text document is represented by its corresponding element in the rector. The dimension of this vector is the number of features that exist.

As can be appreciated by those skilled in the art, the generated vector represents the received document Doc and may be employed in place of the received document Doc in later processing. After this process, the received document Doc can be represented by vector x.

For multi-class cases, there are two possibilities.

The first possibility exists when a common feature list is established for all classes in the training stage. Since there is only one feature list, the received document Doc would have only one corresponding vector to convert into. The same approach employed to process the two-class case may be employed to convert the received document Doc into vector. After this process, the received document Doc can be represented by vector x.

The second possibility exists when a distinctive feature list is established for each class in the training stage. Because there are different feature lists for different classes, the received document Doc is converted to different vectors: one for each class. In this case, the feature lists generated in the Training Stage are checked one by one. For any given feature list, the received document Doc is converted to a vector using an analogous approach to that employed for converting the two-class case mentioned above.

After this process, for any given charset #s ($C_s$) (s=1, ..., S), the received document Doc may be represented by a series of vectors $x_1, x_2, \ldots, x_s$. $x_s$ (s=1, ..., S) representing the corresponding vector of Doc for charset #s.

Next, the value of the decision function for ranking similarities is computed.

FIG. 11 is a graphical representation of equation 8 below. For two-class cases, put vector x of the received document Doc and SVM model-related information into the equation below $$f(x) = \mathrm{sgn}\left(\sum_{x_i \in SV} l_i \alpha_i^* \cdot K(x_i \cdot x) - b_0\right) \qquad \text{Equation 8}$$

to compute the value of f(x). If f(x)>0 then the decision is that the received document Doc belongs to the charset of the positive class; else, the received document Doc belongs to that of the negative class.

For multi-class cases, there are also two possibilities.

The first possibility exists when a common feature list is established for all classes in training stage.

If the multi-class SVM algorithm is employed to directly establish a model for all the classes in training stage, the decision function of multi-class SVM algorithms is employed to decide which class (charset) is the most likely encoding scheme. On the other hand, if the multi-class problem is decomposed into many two-class sub-problems and the SVM models are established using the two-class SVM algorithm, the approach employed with the two-class case for each SVM model of the two-class sub-problems is employed.

FIG. 12 is a graphical representation of equation 9 below. Suppose there are T SVM models and their corresponding optimized solution $\alpha^*$ is $\alpha^{*(1)}, \alpha^{*(2)}, \ldots, \alpha^{*(T)}$ respectively, vector x of the received document Doc and SVM model-related information are input into the following equation $$f^{(t)}(x) = \mathrm{sgn}\left(\sum_{x^{(t)}_i \in SV^{(t)}} l_i^{(t)} \alpha_i^{*(t)} \cdot K(x_i^{(t)} \cdot x) - b_0^{(t)}\right) \quad \text{Equation 9}$$

to compute the value of $f^{(t)}(x)$ for all t=1, 2, . . . , T.

In the training stage, if the one-to-one approach is employed for decomposition, the vote is for the positive class (charset) $\alpha^{*(t)}$ represents if $f^{(t)}(x)>0$. Otherwise, the vote is for the negative class (charset) $\alpha^{*(t)}$ represents. The class (charset) having the highest votes is chosen as the encoding scheme for the received document Doc.

Suppose, for example, the one-against-rest approach is employed in the training stage for decomposition. If $f^{(t)}(x)>0$ and is the largest one for all t=1, 2, . . . , T then the decision is that the received document Doc belongs to the positive class (charset) $\alpha^{*(t)}$ represents. Otherwise, in case of $f^{(t)}(x) \leq 0$ and is the largest one for all t=1, 2, . . . , T, the decision regarding which Encoding Scheme the document Doc should belong to cannot be made in this manner.

For multi-class cases, the second possibility exists when a distinctive feature list is established for different classes in the feature selection procedure. In this case, SVM models are computed for each class respectively. Accordingly, the value of the decision function for the SVM models of each class is computed one by one. FIG. 13 is a graphical representation of equation 10 below. Vectors $\{x_s\}$, (s=1, 2, . . . , S) of Doc and SVM model-related information of charset #s are input into the following equation $$f(x_s) = \mathrm{sgn}\left(\sum_{x^{(t)}_i \in SV^{(t)}} l_i^{(s)} \alpha_i^{(s)*} \cdot K(x_i^{(s)} \cdot x_s) - b_0^{(x)}\right) \quad \text{Equation 10}$$

wherein $f(x_s)>0$ signifies that the received document Doc belong to charset #s. The bigger the value of $f(x_s)$, the more likely that the received document Doc is associated with that charset. After all $f(x_s)$ are computed for all s=1, 2, . . . , S, the $f(x_s)$ values are ranked to ascertain one charset #s with largest $f(x_s)$ value. The charset associated with the largest $f(x_s)>0$ value is employed as the encoding scheme. If there are no positive $f(x_s)$ values, the received document Doc does not belong to any of the charsets of interest.

As can be appreciated by the foregoing, embodiments of the invention provide for a highly efficient technique for automatically detecting the encoding scheme for a received document. Using the discussed feature selection and ranking techniques, it is possible to discriminate among charsets without apparent distinguishing characteristics. In an embodiment, if a charset has an apparent distinguishing characteristic (e.g., UTF-8, UTF-16, etc.), the algorithm may optionally exclude that charset from those processed into SVM models and may instead employ identification rules to quickly ascertain whether the received document is associated with that excluded charset before moving on to the more computationally intensive automatic encoding scheme detection techniques discussed herein to process the received document against the SVM models.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An article of manufacture comprising a program storage medium having a non-transitory computer readable code embodied therein, the computer readable code being configured for handling at least a target document, said target document having been transmitted electronically and involving an encoding scheme, the article of manufacture comprising:

code for ascertaining, using identification rules, whether a charset employed to encode said target document belongs to an excluded charset group, said excluded charset group having at least two charsets, each charset in said excluded charset group selected based on charset inherent characteristics;

code for performing, if said charset employed to encode said target document does not belong to said excluded charset group, further processing of said target document, wherein said code for performing including at least:

code for training, using a plurality of text document samples that have been encoded with different encoding schemes and selected for training purposes said different encoding schemes pertaining to charset encoding, to obtain a set of machine learning models, said training including using a SVM (Support Vector Machine) technique to generate said set of machine learning models from feature vectors converted from said plurality of text document samples, said feature vectors are grouped by charsets, wherein said training including generating fundamental units from said plurality of text document samples and extracting a subset of said fundamental units to form a set of feature lists, said feature vectors are converted from said set of feature lists and said plurality of text document samples, said extracting said subset of said fundamental units includes filtering said fundamental units to obtain fundamental units that are more discriminatory in describing differences among said different encoding schemes;

code for applying said set of machine learning models against a set of target document feature vectors converted from said target document, said applying including analyzing said set of target document feature vectors using said set of machine learning models to compute similarity indicia between said set of target document feature vectors and said set of machine learning models associated with said different encoding schemes, wherein a first encoding scheme associated with said set of machine learning models is designated as said encoding scheme if characteristics of said first encoding scheme as represented by said set of machine learning models are computed to be most similar, relative to other encoding schemes of said different encoding schemes, to said set of target document feature vectors; and code for decoding said target document to obtain decoded content of said target document based on at least said first encoding scheme.

2. The article of manufacture of claim 1 wherein said filtering employs cross-entropy.

3. The article of manufacture of claim 1 wherein said feature vectors are converted using a TF-IDF (Term Frequency-Inverse Document Frequency) technique.

4. The article of manufacture of claim 3 wherein said TF-IDF technique employs a VSM (Vector Space Model) representation approach.

5. The article of manufacture of claim 1 wherein said target document represents an email message.

6. The article of manufacture of claim 1 wherein said target document represents an attachment to an email.

7. The article of manufacture of claim 1 wherein said target document represents at least a portion of a web page.

8. A method for handling a received document, said received document having been transmitted electronically and involving an encoding scheme, the method comprising:

ascertaining, using identification rules, whether a charset employed to encode said target document belongs to an excluded charset group, said excluded charset group having at least two charsets, each charset in said excluded charset group selected based on charset inherent characteristics;

if said charset employed to encode said target document does not belong to said excluded charset group, performing processing of said received document by performing the steps below;

receiving a plurality of text document samples, said plurality of text document samples being encoded with different encoding schemes and selected for training purposes, said different encoding schemes pertaining to charset encoding;

training, using said plurality of text document samples, to obtain a set of machine learning models, said training including generating fundamental units from said plurality of text document samples for charsets of said plurality of text document samples, extracting a subset of said fundamental units as feature lists, said extracting said subset of said fundamental units including filtering said fundamental units to obtain fundamental units that are more discriminatory in describing differences between said different encoding schemes, converting said feature lists into a set of feature vectors, said feature vectors are grouped by charsets, and generating said set of machine learning models from said set of feature vectors using a SVM (Support Vector Machine) technique;

applying said set of machine learning models against a set of target document feature vectors converted from said received document, said applying including analyzing said set of received document feature vectors using said set of machine learning models to compute similarity indicia between said set of target document feature vectors and said set of machine learning models associated with said different encoding schemes, wherein a first encoding scheme associated with said set of machine learning models is designated as said encoding scheme if characteristics of said first encoding scheme as represented by said set of machine learning models are computed to be most similar, relative to other encoding schemes of said different encoding schemes, to said set of received document feature vectors; and decoding said received document to obtain decoded content of said received document based on at least said first encoding scheme.

9. The method of claim 8 wherein said filtering employs a feature selection technique.

10. the method of claim 8 wherein said set of feature vectors are converted using a statistical representation technique.

11. The method of claim 8 wherein said set of feature vectors are converted using a TF-IDF (Term Frequency-Inverse Document Frequency) technique.

12. A method for decoding a target document that represents at least a portion of a web page received through a communication network, said target document having been transmitted electronically and involving an encoding scheme, the method comprising:

ascertaining, using identification rules, whether a charset employed to encode said target document belongs to an excluded charset group, said excluded charset group having at least two charsets, each charset in said excluded charset group selected based on charset inherent characteristics;

if said charset employed to encode said target document does not belong to said excluded charset group, performing said decoding by performing at least steps (a), (b), and (c) below;

(a) training, using a plurality of text document samples that have been encoded with different encoding schemes and selected for training purposes, said different encoding schemes pertaining to charset encoding, to obtain a set of machine learning models, said training including using a SVM (Support Vector Machine) technique to generate said set of machine learning models from feature vectors converted from said plurality of text document samples, said feature vectors are grouped by charsets, wherein said training including generating fundamental units from said plurality of text document samples and extracting a subset of said fundamental units to form a set of feature lists, said feature vectors are converted from said set of feature lists and said plurality of text document samples, said extracting said subset of said fundamental units includes filtering said fundamental units to obtain fundamental units that are more discriminatory in describing differences among said different encoding schemes;

(b) applying said set of machine learning models against a set of target document feature vectors converted from said target document, said applying including analyzing said set of target document feature vectors using said set of machine learning models to compute similarity indicia between said set of target document feature vectors and said set of machine learning models associated with said different encoding schemes, wherein a first encoding scheme associated with said set of machine learning models is designated as said encoding scheme if characteristics of said first encoding scheme as represented by said set of machine learning models are computed to be most similar, relative to other encoding schemes of said different encoding schemes, to said set of target document feature vectors; and (c) decoding said target document to obtain decoded content of said target document based on at least said first encoding scheme; said applying including converting said target document to said set of target document feature vectors; wherein said converting said target document to said set of target document feature vectors employs a TF-IDF (Term Frequency-Inverse Document Frequency) technique; wherein said TF-IDF technique employs a VSM (Vector Space Model) representation approach.

13. The method of claim 12 wherein said filtering employs cross-entropy.

14. The method of claim 12 wherein said feature vectors are converted using a statistical representation technique.

15. The method of claim 12 wherein said target documents represents an email.

* * * * *